J. W. Fifield.
Rat Trap.
N° 95,216.   Patented Sep. 28, 1869.
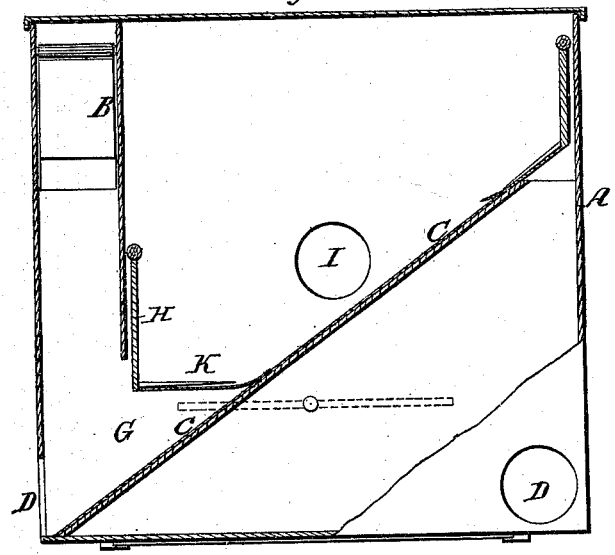
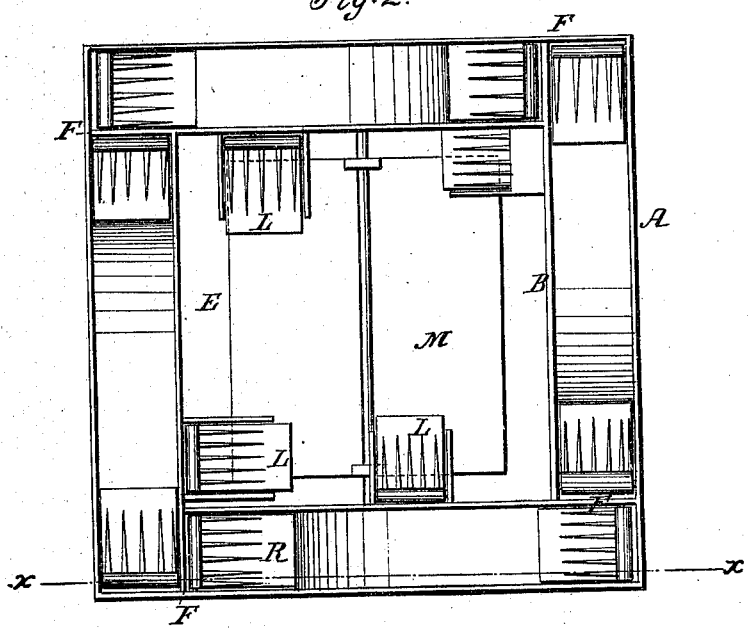
Witnesses.
O. Hinchman.
Jno. F. Brooks.
Inventor.
J. W. Fifield
per Munn & Co.
Att'ys.

United States Patent Office.

J. WARD FIFIELD, OF FRANKLIN, NEW HAMPSHIRE.

Letters Patent No. 95,216, dated September 28, 1869.

IMPROVED RAT-TRAP.

The Schedule referred to in these Letters Patent and making part of the same.

*To all whom it may concern:*

Be it known that I, J. WARD FIFIELD, of Franklin, in the county of Merrimack, and State of New Hampshire, have invented a new and improved Rat-Trap; and I do hereby declare that the following is a full, clear, and exact description thereof, which will enable others skilled in the art to make and use the same, reference being had to the accompanying drawing, forming part of this specification.

The object of this invention is to provide an improved, simple, and cheap rat-trap.

It consists of a double-walled vessel, which may be either square or round, with inclined passages between the walls, leading from openings in the exterior wall, near the bottom, to the interior chamber through other openings in the inner walls, the interior openings being provided with doors which open readily inward to the animals seeking ingress, but close effectually against their efforts to get out.

The said doors are of peculiar construction, calculated to excite the animals to enter, and armed with sharp pins, to prevent their exit.

Figure 1 represents a sectional elevation of my improved trap, taken on the line $x$–$x$ of fig. 2.

Figure 2 represents a plan view of the same.

Similar letters of reference indicate corresponding parts.

A represents an exterior vessel, of metal or wood, as preferred, and B, an interior vessel, between the walls of which I propose to make inclined ways, C, leading from exterior openings, D, through openings in the interior vessel to an inner space, E.

Each side-wall of the inner vessel is extended beyond one corner, across the space between the two vessels to the wall of the outer one, as shown at F, crossing the inclined ways a short distance beyond the exterior openings D. At these crossings are openings, G, and inside of them, doors, H, are hinged, so as to swing open inwardly. Similar doors are also provided inside the passages I through the inner walls.

The vertical parts of these doors project but a little below the openings, and are armed at their lower ends with sharp-pointed teeth, K, projecting horizontally from the walls upon which the doors hang.

The doors are also provided with canvas, or other similar curtains, L, to close the passages, but yield readily to the first efforts of the animals to enter, and to hide the points, and prevent them from annoying the animals until they get too far in to retreat, which the said points will prevent in a way well understood.

The bottom of the interior vessel may be provided with water or poisonous substances, for destroying the animals, and a tilting-plane, M, may be placed above the bottom, to induce the animals to jump down from the tables placed under the passages through the walls of the inner vessels.

In a square-formed trap, four of these passages C may be provided from the exterior openings D most conveniently, with a similar number of openings through the interior walls.

But if circular traps be used, any preferred number of passages may be used which the size of the vessel will permit.

In either case, two of the self-closing doors are interposed between the animals and freedom after entering the interior space, effectually preventing escape.

A trap-door or slide may be provided in the bottom, for the removal of the animals, as required.

Having thus described my invention,

What I claim as new, and desire to secure by Letters Patent, is—

The combination of the double walls, swinging doors, covered pins, and suitable conducting-ways, as and for the purpose specified.

J. WARD FIFIELD.

Witnesses:
N. H. SANBORN,
DAVID E. BROWN.